(12) United States Patent
Lundsgaard et al.

(10) Patent No.: US 10,697,438 B2
(45) Date of Patent: Jun. 30, 2020

(54) SYSTEM FOR DETECTION OF FOUNDATION MOVEMENT IN A WIND TURBINE

(71) Applicant: SCADA INTERNATIONAL A/S, Aulum (DK)

(72) Inventors: Marlene Lundsgaard, Herning (DK); Thomas Bagger, Silkeborg (DK)

(73) Assignee: SCADA INTERNATIONAL A/S, Aulum (DK)

( * ) Notice: Subject to any disclaimer, the term of this patent is extended or adjusted under 35 U.S.C. 154(b) by 964 days.

(21) Appl. No.: 15/177,873

(22) Filed: Jun. 9, 2016

(65) Prior Publication Data

US 2017/0356424 A1 Dec. 14, 2017

(51) Int. Cl.

| | | |
|---|---|---|
| *G01B 5/14* | (2006.01) |
| *F03D 17/00* | (2016.01) |
| *G01B 21/24* | (2006.01) |
| *G01M 5/00* | (2006.01) |
| *G01B 21/16* | (2006.01) |
| *G01B 5/252* | (2006.01) |
| *G01B 13/19* | (2006.01) |

(52) U.S. Cl.
CPC ............. *F03D 17/00* (2016.05); *G01B 5/14* (2013.01); *G01B 5/252* (2013.01); *G01B 13/19* (2013.01); *G01B 21/16* (2013.01); *G01B 21/24* (2013.01); *G01M 5/0025* (2013.01); *G01M 5/0041* (2013.01); *G01M 5/0066* (2013.01); *G01M 5/0083* (2013.01); *F05B 2240/912* (2013.01); *F05B 2260/83* (2013.01); *F05B 2270/821* (2013.01); *Y02E 10/728* (2013.01)

(58) Field of Classification Search
CPC ........... F03D 17/00; G01B 5/14; G01B 5/252; G01B 21/16
See application file for complete search history.

(56) References Cited

U.S. PATENT DOCUMENTS

| | | | | |
|---|---|---|---|---|
| 8,053,916 B2 * | 11/2011 | Edwards | ............... | F03B 13/142 290/44 |
| 8,129,852 B2 * | 3/2012 | Edwards | ................. | B63B 39/02 290/44 |

\* cited by examiner

*Primary Examiner* — Woody A Lee, Jr.
*Assistant Examiner* — Michael L Sehn
(74) *Attorney, Agent, or Firm* — Cermak Nakajima & McGowan LLP; Malcolm K. McGowan (57) ABSTRACT

A monitoring system (100) monitors displacement of a wind turbine tower and includes at least one plumb bob with an upper part and a lower part, each plumb bob being configured to be pivotally suspended at its upper part, via a suspension device, from a point above so as to attain a rest position in a rest situation, and each said plumb bob has one or more sensing surfaces (12, 12'). One or more suspension devices means (10) suspend the at least one plumb bob. Two or more sensors (14, 14', 14"), each being configured to sense, in a specific sensing direction (16, 16', 16"), a distance to a plumb bob, provide displacement data. At least two of the two or more sensors (14, 14', 14") are arranged in a sensing vicinity of a plumb bob, with at least two of the specific sensing directions (16, 16', 16") not being parallel to each other. The monitoring system includes a control unit (18) configured to receive the displacement data from two or more of the sensors, and a device for reporting, to an external unit (20), parameter(s) representing displacement of a wind turbine tower.

13 Claims, 7 Drawing Sheets

SYSTEM FOR DETECTION OF FOUNDATION MOVEMENT IN A WIND TURBINE

BACKGROUND

Field of Endeavor

The present application relates, in a first aspect, to a monitoring system for monitoring displacement of a wind turbine tower. In a second aspect, the application relates to a device including a system according to the first aspect. In a third aspect, the application relates to a use of a system of the first aspect or the use of a device according to the second aspect for monitoring displacement of a wind turbine tower. In a third aspect, the application relates to a method for monitoring displacement of a wind turbine tower. In a fifth aspect, the application relates to a wind turbine tower including a system according to the first aspect or a device according to the second aspect. In a sixth aspect, the application relates to a wind turbine including a wind turbine tower according to the fifth aspect.

Brief Description of the Related Art

Many engineering constructions have a foundation member connecting a tower structure to the ground. One example of such construction is a wind turbine. A typical wind turbine includes an elongate tower attached to a foundation that is intended for transferring vertical loads as well as horizontal dynamic loads of the wind turbine to the ground. In order to prevent angular deflection of the foundations, a robust design of the foundations is required.

In operation, the load of the foundation can reach a critical level due to the additional load caused by the horizontal dynamic loads of the wind turbine during operation of the wind turbine. It is a significant problem if the load of the foundation is so large that the displacement between a foundation member and a base member attached to the foundation member exceeds a critical displacement limit.

In FR 2 314 478 A1 is disclosed an inclinometer having adjustable sensitivity for measuring deviations from a vertical direction of an architectural structure. The inclinometer includes a hanging mass being suspended by a flexible strip which is fixed to an upper base. Strain gauges arranged in the vicinity of the flexible strip act as sensors for determining an inclination of the hanging mass. The mass is contained in oil. The level of the oil determines the sensitivity of the inclinometer. FR 2 314 478 A1 does not disclose that the inclinometer includes a control unit configured to receive displacement date from the strain gauges.

WO 2013/167128 A1 discloses a monitoring system configured to monitor a vertical displacement between a foundation member and a base member attached to the foundation member. The monitoring system includes three sensors adapted to measure displacement between the foundation member and the base member of a wind turbine tower, in which each of the three sensors is arranged on a vertically extending rod fixed to the foundation member. A control unit is configured to receive displacement data from the sensors and to send the received displacement data to an external unit.

Although the monitoring system disclosed in WO 2013/167128 A1 provides for efficient and precise monitoring of the displacement between the foundation member and the base member of a wind turbine tower, this system nevertheless presents a number of drawbacks.

One drawback is that in a situation in which the sensors are arranged on the inside of the turbine tower, it may happen that a displacement is occurring in such a way that the part of the foundation member in which the sensors are mounted breaks loose from the rest of the foundation. In such a case, the system disclosed in WO 2013/167128 A1 will not detect the displacement between the foundation member and the base member.

Therefore, in order for the system disclosed in WO 2013/167128 A1 to provide accurate and precise monitoring of a displacement between a foundation member and a base member in all situations, it will be necessary to install the sensors on the outside of the wind turbine tower, such that the sensors really are anchored into the foundation member. Only in this mode will the system disclosed in WO 2013/167128 A1 be reliable in all situations.

Installing the monitoring system of WO 2013/167128 A1 on the outside of the turbine tower makes the system susceptible to effects caused by the environment such that dirt, wind, rain, and ice, in a detrimental way, may cause the monitoring system to go out of its correct calibration; either slowly over time, or even suddenly. When such a system is out of calibration it does not provide the correct displacement data and is in fact useless.

A similar problem arises in relation to vandalism. When such a system is installed on the outside of the turbine tower, it is very much susceptible to vandalism, which may cause the same type of calibration failure.

Furthermore, laser sensors may be sensitive towards distances when insects or other small animals originating from the environment settle on the plate being sensed by the laser sensor. In such a case, the laser sensor will sense a false distance and thus provide erroneous displacement data.

Therefore, there is need for an improved system and a method that can be used to monitor the displacement between a foundation member and a base member attached to the foundation member.

SUMMARY

Accordingly, the present application relates in a first aspect to a monitoring system for monitoring displacement of a wind turbine tower, said monitoring system comprises:
one or more plumb bobs each comprising an upper part and a lower part; each plumb bob being configured to be pivotally suspended at its upper part, via suspension means, from a point above so as to attain a rest position in a rest situation; each of said plumb bobs comprising one or more sensing surfaces;
one or more suspension means for suspending said one or more plumb bobs;
two or more sensors, each being configured to sense, in a specific sensing direction, a distance to a plumb bob, and thereby provide a displacement data;
wherein at least two of said two or more sensors being arranged in a sensing vicinity of a plumb bob;
wherein at least two of said specific sensing directions are not being parallel to each other;
wherein said monitoring system furthermore comprises a control unit configured to receive said displacement data from two or more of said sensors; and
wherein said system furthermore comprises means for reporting to an external unit, parameter(s) representing displacement of a wind turbine tower.

In a second aspect, the present application relates to a device for mounting on an inner wall of a wind turbine tower and for monitoring displacement of said wind turbine tower;

said device comprises a monitoring system according to the first aspect of the present invention;

wherein said one or more plumb bobs and said two or more sensors are enclosed within a housing, and wherein said one or more plumb bobs are pivotally suspended in said suspension means from an upper part of said housing at a fixing point thereof.

In a third aspect, the present application relates to the use of a system according to the first aspect; or, of a device according to the first aspect for monitoring displacement of a wind turbine tower.

In a fourth aspect, the present invention relates to a method for monitoring a displacement of a wind turbine tower, said method comprises:

i) providing one or more plumb bobs each comprising an upper part and a lower part; each plumb bob being configured to be pivotally suspended at its upper part, via suspension means;

ii) suspending said one or more plumb bobs from a fixing point at an inner wall of a wind turbine tower in a suspension means so as to allow it/them to attain a rest position in a rest situation;

iii) providing two or more sensors, each being configured to sense, in a specific sensing direction, a distance to a plumb bob, and thereby provide a displacement data;

iv) arranging said two or more sensors in a sensing vicinity of a plumb bob in such a way that at least two of said sensing directions are not parallel to each other;

v) providing a control unit which is configured to receive said displacement data from two or more of said sensors; and vi) allowing said control unit to automatically report to an external unit, a parameter representing a displacement of a wind turbine tower.

In a fifth aspect, the present application relates to wind turbine tower comprising a system according to according to the first aspect; or comprising a device according to the second aspect In a sixth aspect, the present application relates to a wind turbine comprising a wind turbine tower according to the fifth aspect.

The subject matter of this application, in its various aspects, provides for a monitoring system, devices, uses and methods which are more reliable, less prone to environmental impacts and impact due to vandalism, which is in essence maintenance free and easier to install.

BRIEF DESCRIPTION OF THE DRAWINGS

FIG. 2b is a plane view seen from above illustrating the configuration of a plumb bob and three associated sensors of FIG. 2a.

DETAILED DESCRIPTION OF EXEMPLARY EMBODIMENTS

The First Aspect

In its first aspect, the present application relates to a monitoring system for monitoring displacement of a wind turbine tower, in which the monitoring system includes:

one or more plumb bobs each having an upper part and a lower part; each plumb bob being configured to be pivotally suspended at its upper part, via suspension devices, from a point above so as to attain a rest position in a rest situation; each of the plumb bobs including one or more sensing surfaces;

one or more suspension devices for suspending said one or more plumb bobs;

two or more sensors, each being configured to sense, in a specific sensing direction, a distance to a plumb bob, and thereby provide a displacement data;

wherein at least two of the two or more sensors are arranged in a sensing vicinity of a plumb bob;

wherein at least two of said specific sensing directions are not parallel to each other;

wherein the monitoring system further includes a control unit configured to receive said displacement data from two or more of the sensors; and wherein the system further comprises means for reporting to an external unit, parameter(s) representing displacement of a wind turbine tower.

By arranging each plumb bob in the vicinity of a sensor at a specific distance in a sensing direction of that sensor, it will be possible to monitor any displacement of that plumb bob in relation to that specific sensor. By making sure that the sensing directions of the two or more sensing direction are not parallel, it is ensured that a displacement can be monitored in relation to any direction. In case the suspension devices have a specifically short length and by ensuring that the plumb bob(s) is/are suspended in a lower part of the wind turbine tower, one can make sure that the monitoring system is monitoring a displacement between a foundation member and a base member, rather than just monitoring vibrations or bends of the wind turbine tower.

In the present description and in the appended claims it shall be understood that a foundation member may be any type of foundation, e.g., a concrete foundation for a wind turbine. The base member may be any base member of the wind turbine tower construction. Under normal operation conditions of the wind turbine, the base member is connected to the foundation member.

In the present description and in the appended claims the term "displacement of a wind turbine tower" shall preferably be interpreted to specifically mean a displacement or deflection of the wind turbine tower which will result in a situation in which the turbine tower will have an inclination or slope relative to the vertical direction, which is different from the original and/or intended vertical direction. In particular, in the present description and in the appended claims the term "displacement of a wind turbine tower" shall be interpreted to mean a displacement between a foundation member and a base member of a wind turbine tower.

In one embodiment of the monitoring system according to the first aspect, one or more of the one or more plumb bobs at least partly includes a cylindrical sensing surface, wherein the plumb bob is configured to be suspended in such a way that the direction of gravity is parallel to an axial direction of the cylindrical surface when being suspended in a rest position.

Using such cylindrical plumb bobs is advantageous in some embodiments, for example where one plumb bob and three sensors are being used.

In the present description and in the appended claims, a rest position shall be interpreted as a position in which the wind turbine tower is not displaced in any direction and in which there is no displacement between a foundation member and a base member of the wind turbine tower.

In one embodiment of the monitoring system according to the first aspect, one or more of the one or more plumb bobs at least partly includes two planar sensing surfaces, the two planar sensing surfaces preferably being perpendicular to each other.

Such an embodiment is advantageous in case one plumb bob and two sensors are being used in the monitoring system.

In one embodiment of the monitoring system according to the first aspect, the number of plumb bobs is 1, 2, 3, or 4.

By this number of plumb bobs, a fine balance of accuracy and simplicity of the monitoring system is ensured.

In one embodiment of the monitoring system according to the first aspect, the number of sensors is 2, 3, 4, or 5.

By this number of sensors a fine balance of accuracy and simplicity of the monitoring system is ensured.

In one embodiment of the monitoring system according to the first aspect, the angle between a sensing direction of any two of the two or more sensors is independently selected from the range of 65°-140°, such as 70°-135°, for example 75°-130°, e.g., 80°-125°, such as 85°-120°, for example 90°-115°, e.g., 95°-110° or 100°-105°.

These angles provide a sufficient degree of "non-parallel" sensing directions which in turn provides for accurate determinations of displacement of a wind turbine tower.

In one embodiment of the monitoring system according to the first aspect, the system includes one and only one plumb bob; and the system includes three sensors which are arranged in an equilateral triangle around the plumb bob when being arranged in a rest position.

Such a configuration of the plumb bob and sensors provides accurate determinations of displacement of a wind turbine tower and yet still be of a quite simple design.

In one embodiment of the monitoring system according to the first aspect, the system has one and only one plumb bob and two sensors.

These configurations of the plumb bob and sensors will provide accurate determinations of displacement of a wind turbine tower and yet still be of a quite simple design.

In one embodiment of the monitoring system according to the first aspect, the suspension device independently includes a string or a rod, or a combination of a string and a rod, such as an upper rod and a lower string, or an upper string and a lower rod, for suspending one or more of the one or more plumb bobs.

Use of a string as the suspension device provides for a simple design. However, in order to dampen any potential vibrations in the suspension device, it may be advantageous to include a rod in the suspension device.

In one embodiment of the monitoring system according to the first aspect, one or more of the one or more sensors independently is an inductive sensor, a laser sensor, and/or a magnetic sensor.

These types of sensors provide for a simple and yet accurate measurements of a displacement between a foundation member and a base member of a wind turbine tower.

In one embodiment of the monitoring system according to the first aspect, the length of the suspension device is adjusted so as to provide a radius of pivotally movement of the plumb bob of 0.5 m-8.0 m, such as 1.0 m-7.5 m, for example 1.5 m-7.0 m, e.g., 2.0 m-6.5 m, for example 2.5 m-6.0 m, such as 3.0 m-5.5 mm, for example 3.5 m-5.0 m or 4.0 m-5.0 m.

These radii of the pivotally movement of the plumb bob provide for accurate determinations of a displacement between a foundation member and a base member of a wind turbine tower.

In the present description and in the appended claims the term "radius of pivotally movement of the plumb bob" shall be construed to mean the distance from the fixing point of the suspension device to a point on the sensing surface of the plumb bob being sensed by a sensor.

In one embodiment of the monitoring system according to the first aspect, the system is configured in such a way that the parameter(s) representing displacement of a wind turbine tower and to be reported to an external unit relate(s) to magnitude of movement and/or direction of movement.

These parameters provide for the necessary features of the displacement, to be monitored, between a foundation member and a base member of a wind turbine tower.

In one embodiment of the monitoring system according to the first aspect and in respect of one or more of the plumb bobs, the system further includes a container having a liquid and is configured to at least partly accommodate a lower part of one or more of the one or more plumb bobs in order to dampen any movements of the plumb bob of a vibrational nature.

Such a set-up of a container with a liquid will allow filtering off any vibrational movement of the plumb bob which do not relate to any displacement between a foundation member and a base member of the wind turbine tower.

In one embodiment of this embodiment, the viscosity of the liquid is selected from the range of 50-120 mPa·s, such as 55-115 mPa·s, for example 60-110 mPa·s, e.g. 65-105 mPa·s, such as 70-100 mPa·s, such as 75-95 mPa·s, for example 80-90 mPa·s.

Such a liquid may be selected amongst mineral oil or synthetic oils or mixtures thereof, optionally also including one or more diluters or solvents.

In one embodiment of the monitoring system according to the first aspect, the system is configured to automatically report, to an external unit, an alert in case a predetermined alert criteria is met, the alert criteria optionally relating to a specific magnitude of displacement of a wind turbine tower.

Such a system allows an operator of a wind turbine to take action in case a critical magnitude of displacement of a wind turbine tower is encountered.

In one embodiment of the monitoring system according to the first aspect, the external unit is an internet server adapted to receive and store the parameter(s) representing displacement of a wind turbine tower.

In one embodiment of the monitoring system according to the first aspect, the control unit is configured to be reachable remotely via an Internet Protocol connection (IP connection), UMTS (Universal Mobile Telecommunications System) connection, or via a fiber optic network.

This embodiment ensures the monitoring of the displacement of a wind turbine tower anywhere which provides access to such connections.

In one embodiment of the monitoring system according to the first aspect, the system further includes one or more sensor mounting brackets for mounting the two or more sensors.

Mounting brackets for the sensors ensure sturdy mounting of the sensors and hence provides for accurate measurements.

In one embodiment of the monitoring system according to the first aspect, the system further includes one or more brackets for fixation of the one or more suspension devices.

Mounting brackets for the suspension devices ensure a correct and optimum location of the suspended plumb bobs and hence provides for accurate measurements.

In one embodiment of the monitoring system according to the first aspect, the one or more of the two or more sensors includes position adjustment devices for adjustment or calibration of the position of the sensors, the adjustment devices optionally being configured to allow adjustment or calibration in one, two, or three dimensions.

This system ensures fast and easy set-up and calibration of the sensors and the monitoring system per se.

The Second Aspect

In its second aspect, the present disclosure relates to a device for mounting on an inner wall of a wind turbine tower and for monitoring displacement of the wind turbine tower, in which the device includes a monitoring system according to the first aspect;

wherein the one or more plumb bobs and the two or more sensors are enclosed within a housing, and wherein the one or more plumb bobs are pivotally suspended by the suspension devices from an upper part of the housing at a fixing point thereof.

Such a device ensures easy mounting and set-up of the monitoring system. Further, such a device ensures that no unauthorized access to the delicate monitoring system is available once mounted on an inner wall of a wind turbine tower.

In one embodiment of the device according to the second aspect, the housing includes one or more mounting devices for mounting the housing onto an inner wall of a wind turbine tower.

In one embodiment of the device according to the second aspect, the one or more of the one or more mounting devices includes one or more magnets.

These embodiments ensure easy mounting and set-up of the monitoring system.

In one embodiment of the device according to the second aspect, the housing is a closed housing having one or more inspection hatches for providing access to the interior of said housing.

Inspection hatches for providing access to the interior of the housing ensures that the monitoring system housed within the housing may be easily inspected.

In one embodiment of the device according to the second aspect, the housing includes:

a lower part having one or more plumb bobs and the two or more sensors; and a tubular upper part extending in a vertical direction from an opening in an upper wall of the lower part;

wherein the suspension device is pivotally fixed at a fixing point at an upper part of the tubular upper part, thereby allowing the tubular upper part to accommodate the suspension device.

This design of the device ensures easy mounting and set-up of the monitoring system and at the same time allows enclosure of one or more plumb bobs being suspended by a suspension device having a relatively long extension.

The Third Aspect

In its third aspect, the present disclosure relates to the use of a system according to the first aspect or of a device according to the second aspect for monitoring displacement of a wind turbine tower.

In one embodiment of the use according to the third aspect, the use relates to monitoring a displacement between a base member and a foundation member of a wind turbine tower.

This embodiment ensures monitoring of the integrity of the connection between a base member and a foundation member of a wind turbine tower.

The Fourth Aspect

In its fourth aspect, the present disclosure relates to a method for monitoring a displacement of a wind turbine tower, the method including:

i) providing one or more plumb bobs, each having an upper part and a lower part, each plumb bob being configured to be pivotally suspended at its upper part, via a suspension device;

ii) suspending the one or more plumb bobs from a fixing point at an inner wall of a wind turbine tower in a suspension device so as allow it/them to attain a rest position in a rest situation;

iii) providing two or more sensors, each being configured to sense, in a specific sensing direction, a distance to a plumb bob, and thereby provide a displacement data;

iv) arranging the two or more sensors in a sensing vicinity of a plumb bob in such a way that at least two of the sensing directions are not parallel to each other;

v) providing a control unit which is configured to receive displacement data from two or more of the sensors; and vi) allowing said control unit to automatically report, to an external unit, a parameter representing a displacement of a wind turbine tower.

In one embodiment of the use according to the fourth aspect, the method automatically reports an alert in case a predetermined alert criterion is met, the alert criteria optionally relating to a specific magnitude of displacement of a wind turbine tower.

Such a method allows an operator of a wind turbine to take action in case a critical magnitude of displacement of a wind turbine tower is encountered.

In one embodiment of the use according to the fourth aspect, the method is performed by using a system according to the first aspect or by using a device according to the second aspect.

The Fifth Aspect

In its fifth aspect, the present disclosure relates to a wind turbine tower including a system according to the first aspect or a device according to the second aspect.

In one embodiment of the fifth aspect, the system or device is arranged in a lower part of the wind turbine tower, such as at a height of 30% or lower of the total height of the wind turbine tower, for example at a height of 25% or lower of the total height of the wind turbine tower, e.g., at a height of 20% or lower of the total height of the wind turbine tower, such as at a height of 15% or lower of the total height of the wind turbine tower, for example at a height of 10% or lower of the total height of the wind turbine tower or at a height of 5% or lower of the total height of the wind turbine tower.

It is preferred that the sensors and the plumb bob(s) are being arranged in a lower part of the wind turbine tower, such as at a lower 0.5 m-5.0 m of the wind turbine tower, such as at a lower 1.0 m-4.5 m of the wind turbine tower, for example at a lower 1.5 m-4.0 m of the wind turbine tower, such as at a lower 2.0 m-3.5 m of the wind turbine tower, or at a lower 2.5 m-3.0 m of the wind turbine tower.

The Sixth Aspect

In its sixth aspect, the present disclosure relates to a wind turbine having a wind turbine tower according to the fifth aspect.

Figure 1:
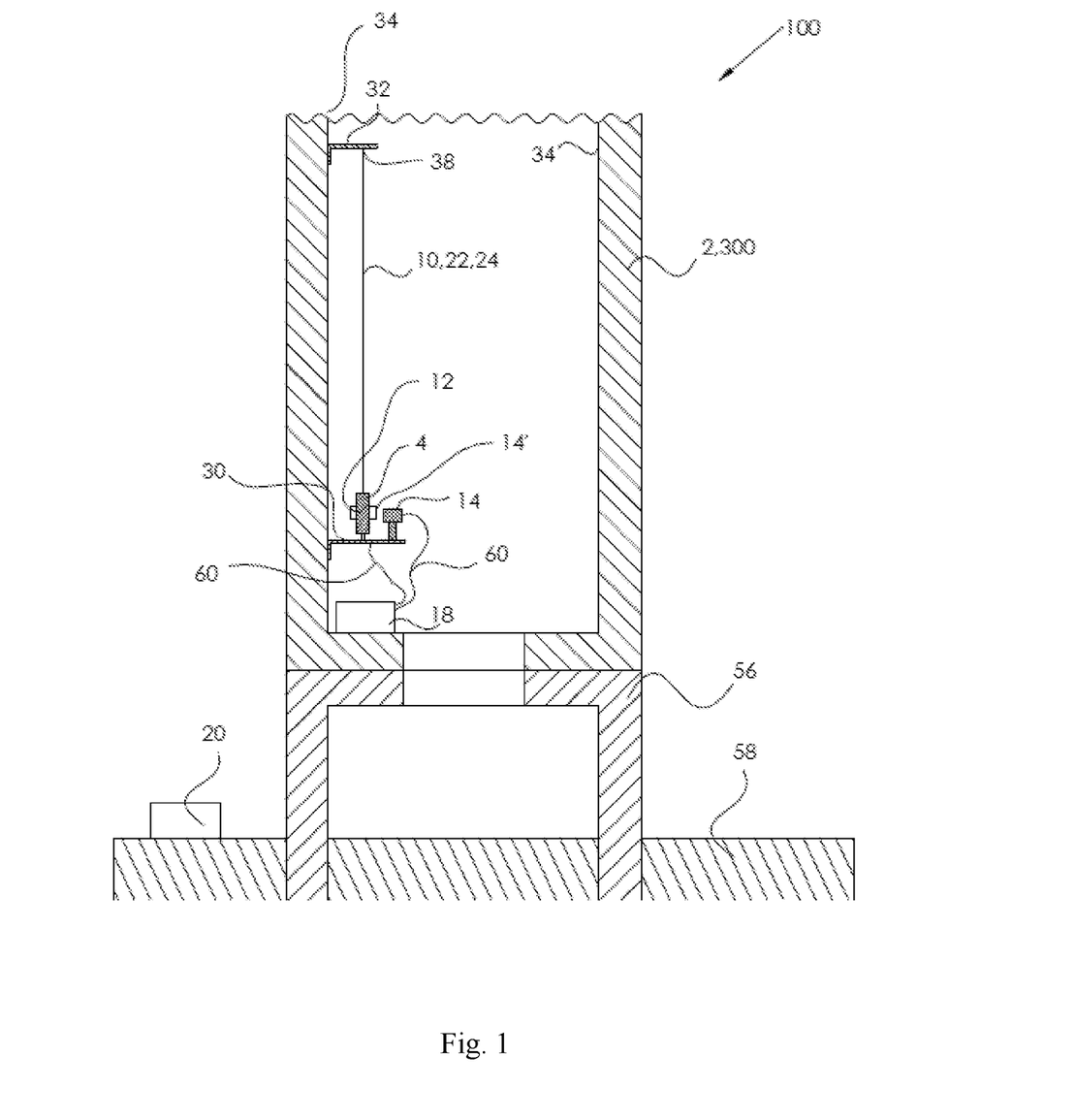
FIG. 1 is a cross-sectional view of a monitoring system according to the first aspect and being installed at an inner wall of a wind turbine tower.

Referring now to the drawings for illustrating exemplary embodiments, FIG. 1 is a cross-sectional view of a monitoring system 100 according to the first aspect and is installed at an inner wall 34 of a wind turbine tower 2, 300. The monitoring system includes:

one plumb bob 4 having an upper part 6 and a lower part 8, the plumb bob being pivotally suspended at its upper part, via a suspension device 10, from a point above so as to attain a rest position in a rest situation, with plumb bobs including sensing surfaces 12.

The plumb bob 4 is suspended by the suspension device 10 from a point above in a fixing point 38.

The system further includes two sensors 14, 14', each being configured to sense, in a specific sensing direction 16, 16' (FIG. 2b), a distance to the plumb bob, and thereby provide displacement data.

The sensors 14, 14' are arranged in a sensing vicinity of a plumb bob 4.

In the system in FIG. 1, at least two of the specific sensing directions 16, 16' are not parallel to each other. The sensors 14, 14' are arranged on bracket 30.

The monitoring system illustrated in FIG. 1 furthermore includes a control unit 18 which is configured to receive displacement data from two or more of the sensors. The sensors 14, 14' are connected to the control unit 18 via connecting wires 60.

In FIG. 1, the plumb bob 4 attains a rest position which is located vertically below the fixing point 38 for the suspension device 10. The suspension device is suspended from a bracket 32.

The rest position of the plumb bob 4 resting in a rest situation will imply that the sensors 14, 14' will sense the sensing distance to the sensing surfaces 12, 12' and the control unit will optionally be configured to interpret these sensing distances to a displacement of the wind turbine tower 2, 300 of zero (0).

In case the wind turbine tower is subjected to a displacement, in such a way that the wind turbine tower is no longer vertically arranged, the plumb bob will continuously be vertically suspended in the suspension device from the fixing point 38. However, in such a situation, the plumb bob will have moved in relation to the sensors 14, 14'. Accordingly, in such a displacement situation, at least one of the sensors 14, 14' will sense a different sensing direction commensurate with the degree of displacement of the wind turbine tower.

Subsequently, the control unit will optionally be configured to interpret these altered sensing distances to represent a displacement of the wind turbine tower 2, 300 which is non-zero.

Such a non-zero displacement of the wind turbine tower 2, 300 may subsequently be reported to the external unit 20. For the sake of simplicity, the external unit 20 is in the figures depicted as being located in the vicinity to the turbine tower. However, in reality the external unit 20 may be located at a distant location.

The suspension device 10 may include a string 22 or a rod 24 or a combination thereof.

Figure 2A:
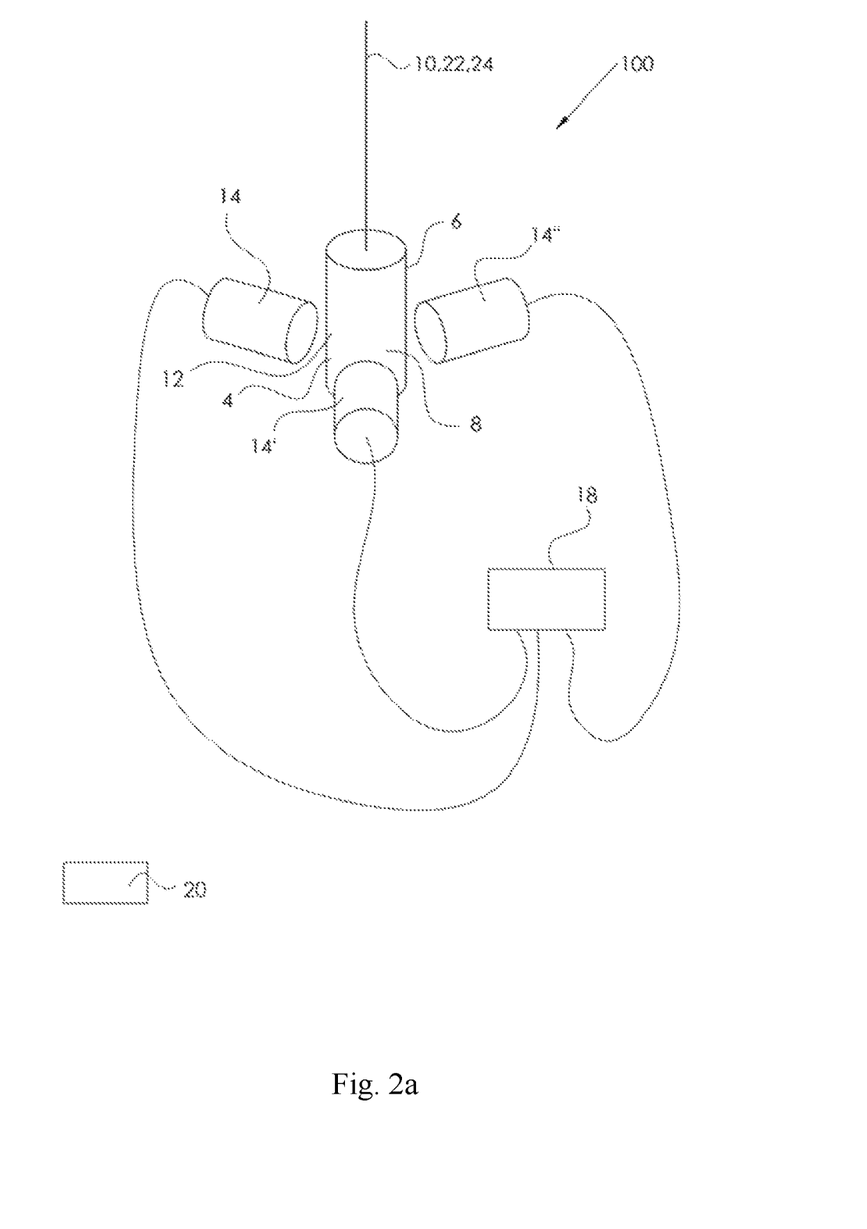
FIG. 2a is a perspective view illustrating the configuration of a plumb bob and three associated sensors according to one embodiment of the first aspect.

FIG. 2a is a perspective view illustrating an alternative configuration of a plumb bob 4 and three associated sensors 14, 14', 14" according to one embodiment of the first aspect. In this configuration, the plumb bob 4 is suspended so as to be located in the center of an equilateral triangle when the plumb bob is arranged in a rest position.

Figure 2B:
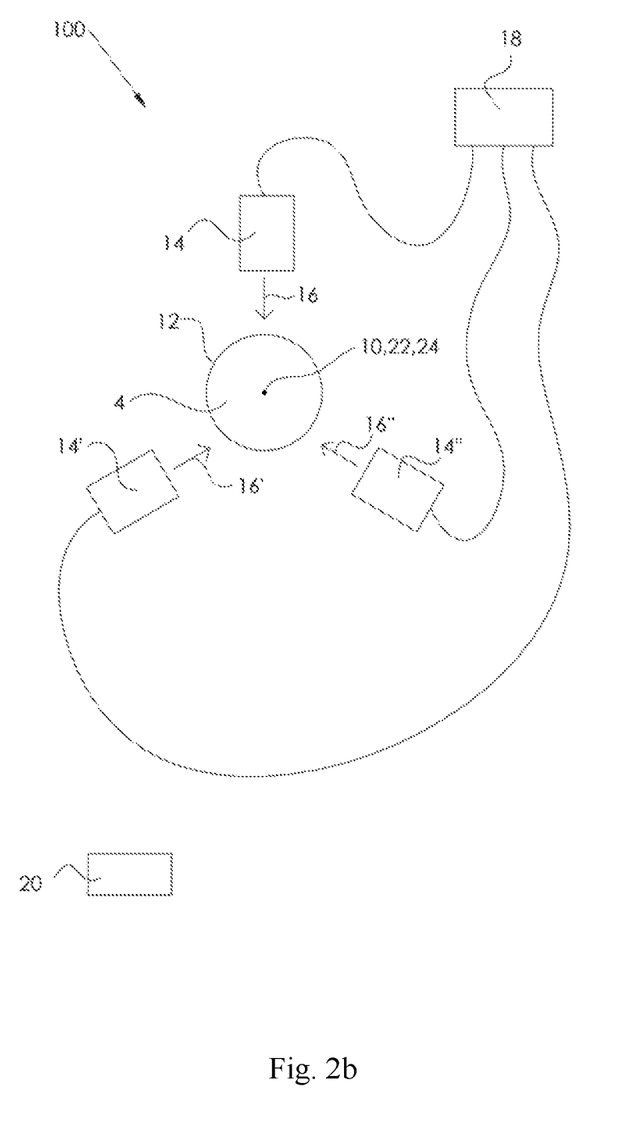

FIG. 2b is a plan view seen from above illustrating the configuration of a plumb bob and three associated sensors of FIG. 2a.

FIG. 2b shows that the plumb bob 4 has a sensing surface 12. Each sensor 14, 14', 14" will sense in a specific sensing direction 16, 16', 16" towards the sensing surface 12 of the plumb bob 4. It is noted that the sensing directions 16, 16', 16" are mutually non-parallel.

Figure 3:
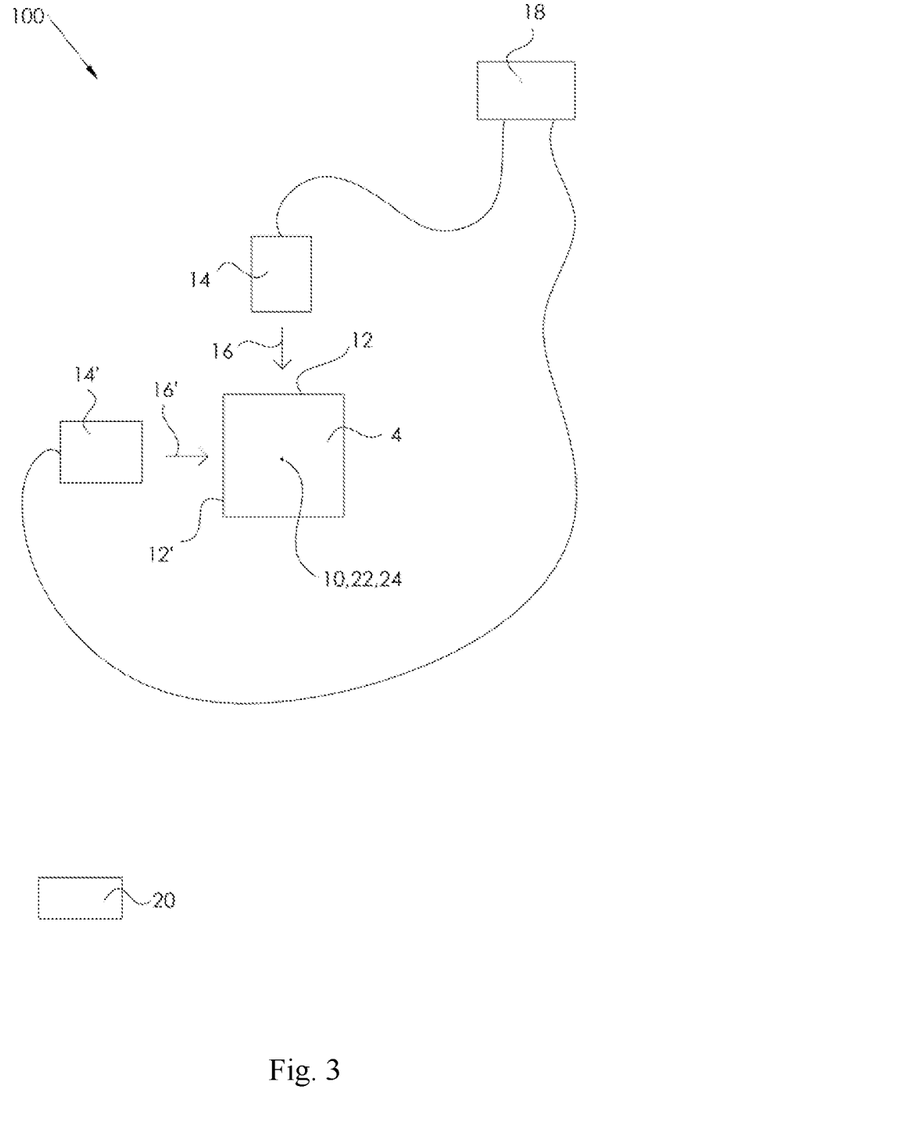
FIG. 3 is a plan view seen from above and illustrating the configuration of a plumb bob and two associated sensors according to one embodiment of the first aspect.

FIG. 3 is a plan view seen from above illustrating the configuration of a plumb bob and two associated sensors according to one embodiment of the first aspect.

FIG. 3 shows that the plumb bob 4 includes two sensing surfaces 12, 12'. Each sensor 14, 14' will sense in a specific sensing direction 16, 16' towards the sensing surface 12, 12' of the plumb bob 4. It is noted that the sensing directions 16, 16' are mutually perpendicular.

Figure 4:
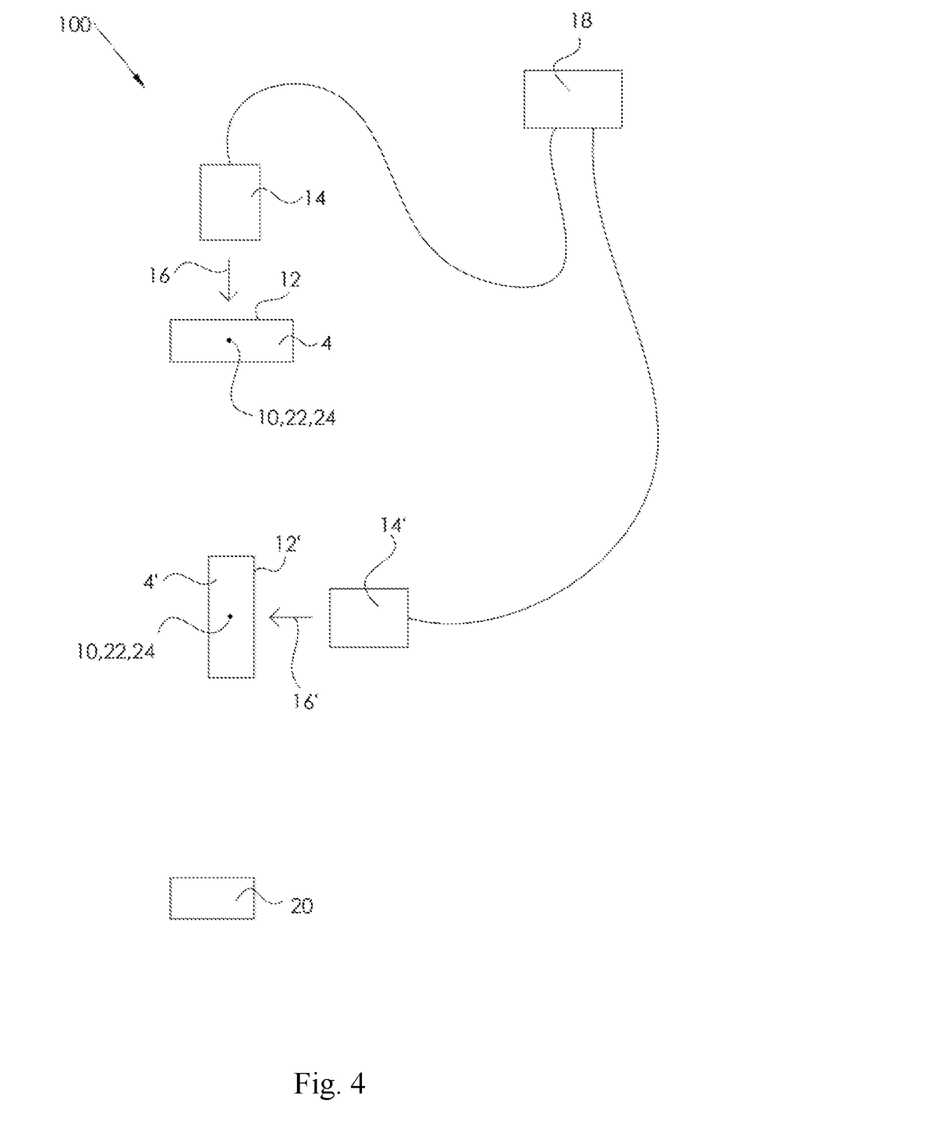
FIG. 4 is a plan view seen from above and illustrating the configuration of two plumb bobs and two associated sensors according to one embodiment of the first aspect.

FIG. 4 is a plan view seen from above and illustrating the configuration of two plumb bobs 4, 4' and two associated sensors 14, 14' according to one embodiment of the first aspect.

FIG. 4 shows that the plumb bob 4 has a sensing surface 12 and that the plumb bod 4' has a sensing surface 12'. Each sensor 14, 14' will sense in a specific sensing direction 16, 16' towards the sensing surface 12, 12' of one of the plumb bobs 4, 4'. It is noted that the sensing directions 16, 16' are mutually perpendicular. Accordingly, one sensor 14 will sense a displacement in one direction 16 and the other sensor 14' will sense a displacement in a direction 16' which is perpendicular to the sensing direction 16.

Figure 5:
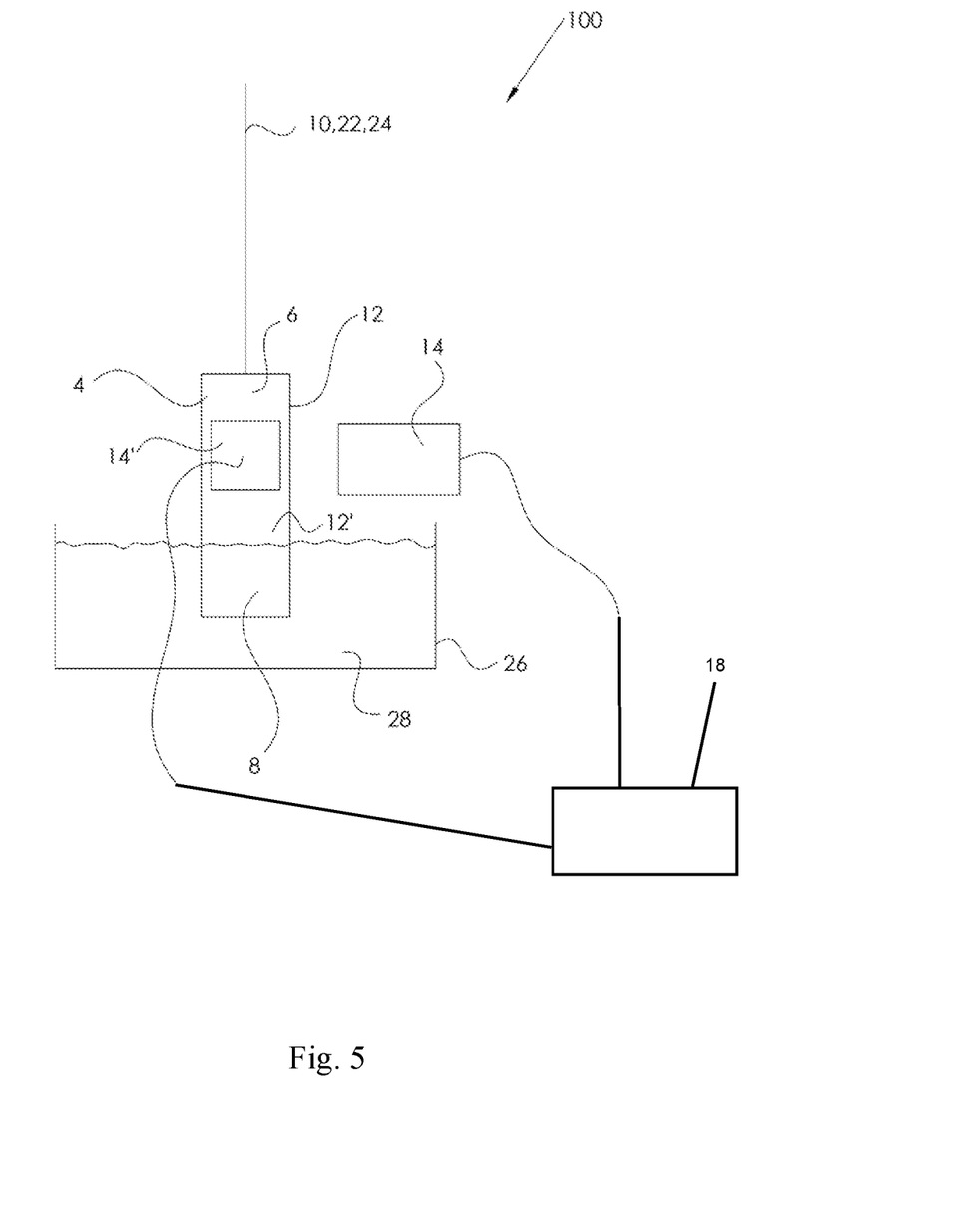
FIG. 5 is a side view illustrating the principle of damping of vibration movement of a plumb bob by submerging it into a liquid.

FIG. 5 is a side view illustrating the principle of dampening vibrational movement of a plumb bob 4 by submerging it into a liquid. In FIG. 5 is seen one plumb bob 4 suspended in a suspension device 10. The plumb bob 4 includes two sensing surfaces 12, 12'. Two sensors 14, 14' each individually sense a distance to a specific sensing surface 12, 12' of the plumb bob. In order to dampen any vibrational movement of the plumb bob 4, the plumb bob is partly submerged in a liquid 28 contained in a container 26.

Figure 6:
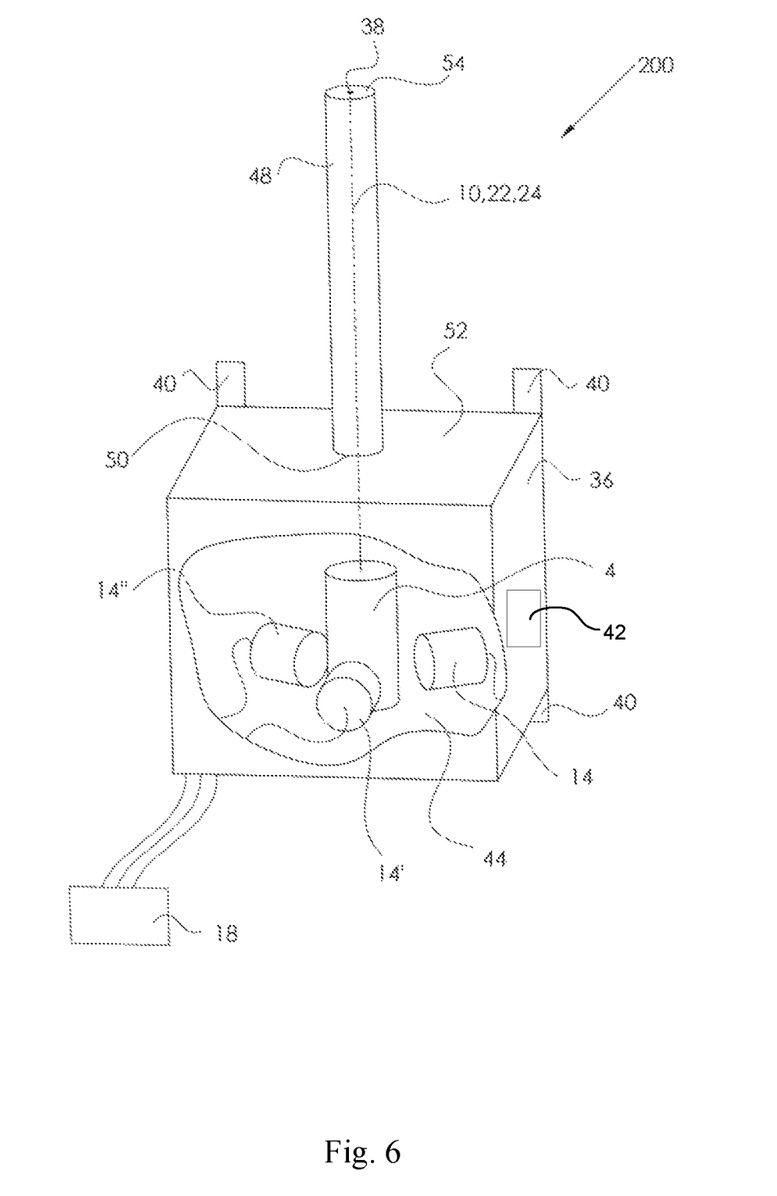
FIG. 6 illustrates one embodiment of a device according to the second aspect.

FIG. 6 illustrates one embodiment of a device 200 according to the second aspect. The device 200 is for mounting on an inner wall 34 of a wind turbine tower 2, 300 and for monitoring displacement of the wind turbine tower.

The device 200 includes the monitoring system according to the first aspect.

In the device 200, the plumb bob 4 and the three sensors 14, 14', 14" are enclosed within a housing 36.

The housing 36 includes a lower part 46 including the plumb bob 4 and three sensors 14, 14', 14".

The housing 36 further includes a tubular upper part 48 extending in a vertical direction from an opening 50 in an upper wall 52 of the lower part 46 of the housing.

The suspension device 10 is pivotally fixed at an fixing point 38 at an upper part 54 of said tubular upper part 48, thereby allowing the tubular upper part to accommodate the suspension device 10.

The device 200 allows for easy and fast installation of the system contained therein. Furthermore, as the device is enclosed in an enclosure or housing, the delicate and sensitive nature of the sensors and the sensing mechanism in general can be kept isolated from the interior of the wind turbine tower thereby avoiding a technician's unintentional touching and modification of the calibration of the system.

It may be preferred that the device 200 includes one or more mounting devices 40 for easy installation onto an inner wall of the wind turbine tower 2, 300. It is preferred that such a mounting device includes one or more magnets.

In one embodiment, the housing 36 is a closed housing optionally having one or more inspection hatches 42 for providing access to the interior 44 of the housing 36.

In the present application it should be understood that any embodiment mentioned in respect of any one aspect of the present invention may equally well apply to any embodiment of any other aspect of the invention to the extent that such an embodiment is feasible.

LIST OF REFERENCE NUMERALS

2 Wind turbine tower
4,4' Plumb bob
6 Upper part of plumb bob
8 Lower part of plumb bob
10 Suspension device
12,12' Sensing surface of plumb bob
14,14',14" Sensor
16,16',16" Sensing direction
18 Control unit
20 External unit
22 String
24 Rod
26 Container
28 Liquid
30 Mounting bracket for sensor
32 Bracket for fixation of suspension device
34 Inner wall of wind turbine tower
36 Housing of device
38 Fixing point for suspension device
40 Mounting device
42 Inspection hatch
44 Interior of housing
46 Lower part of housing
48 Tubular upper part of housing
50 Opening in housing
52 Upper wall of lower part of housing
54 Upper part of tubular upper part of housing
56 Base member of a wind turbine tower
58 Foundation member of a wind turbine tower
60 Connecting wire
100 Monitoring system
200 Device
300 Wind turbine tower
400 Wind turbine While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

We claim:

1. A monitoring system for monitoring displacement of a wind turbine tower, the monitoring system comprising:
   at least one plumb bob having an upper part and a lower part, each plumb bob being configured to be pivotally suspended at its upper part from a point above the at least one plumb bob so as to attain a rest position in a rest situation, each plumb bob comprising at least one sensing surface;
   suspension means for suspending said at least one plumb bob;
   at least two sensors, each sensor being configured to sense, in a specific sensing direction, a distance to at least one of said at least one plumb bob and thereby provide displacement data;
   wherein at least two of said at least two sensors are arranged in a sensing vicinity of at least one of said at least one plumb bob;
   wherein at least two of said specific sensing directions are not parallel to each other;
   a control unit configured to receive said displacement data from at least two of said at least two sensors; and
   said control unit is configured to report to an external unit a parameter representing displacement of a wind turbine tower.

2. A monitoring system according to claim 1, wherein:
   (a) the at least one plumb bob comprises up to four plumb bobs; or
   (b) the at least two sensors comprises up to five sensors; or
   both (a) and (b).

3. A monitoring system according to claim 1, wherein:
   said at least one plumb bob is only one plumb bob; and
   said at least two sensors comprises three sensors arranged in an equilateral triangle around said only one plumb bob when being arranged in a rest position.

4. A monitoring system according to claim 1, wherein:
   said at least one plumb bob is only one plumb bob; and
   said at least two sensors is only two sensors.

5. A monitoring system according to claim 1, wherein said suspension means comprises:
   a string;
   a rod; or
   a combination of a string and a rod with one of the string and the rod being vertically above the other of the string and the rod.

6. A monitoring system according to claim 1, wherein said means for reporting is further for automatically reporting to the external unit an alert when a predetermined alert criteria is met, said alert criteria optionally relating to a specific magnitude of displacement of the wind turbine tower.

7. A monitoring system according to claim 1, wherein said external unit is an internet server adapted to receive and store said parameter representing displacement of the wind turbine tower.

8. A device for mounting on an inner wall of a wind turbine tower and for monitoring displacement of said wind turbine tower, said device comprising:
   a housing including an upper part with a fixing point; and
   the monitoring system according to claim 1;
   wherein said at least one plumb bob and said at least two sensors are enclosed within the housing; and
   wherein said at least one plumb bob is pivotally suspended by said suspension means from the upper part of the housing at the fixing point.

9. A device according to claim 8, wherein said housing comprises mounting means for mounting said housing onto the inner wall of the wind turbine tower, said mounting means optionally comprising at least one magnet.

10. A device according to claim 8, wherein said housing comprises:
a lower part comprising an upper wall, and opening in the upper wall, said at least one plumb bob, and said at least two sensors;
wherein the upper part is tubular and extends in a vertical direction from the opening in the upper wall of the lower part;
wherein said suspension means is pivotally fixed at the fixing point, the fixing point being located at an upper part of the tubular upper part, thereby allowing said tubular upper part to accommodate said suspension means.

11. A wind turbine comprising:
a wind turbine tower having an inner wall; and
the device according to claim 8 mounted to said inner wall.

12. A method for monitoring displacement of a wind turbine tower, the method comprising:
providing at least one plumb bob, each plumb bob comprising an upper part and a lower part, each plumb bob being configured to be pivotally suspended at its upper part via suspension means;
suspending said at least one plumb bob from a fixing point at an inner wall of a wind turbine tower in a suspension means so as allow the at least one plumb bob to attain a rest position in a rest situation;
providing at least two sensors, each sensor being configured to sense, in a specific sensing direction, a distance to at least one of said at least one plumb bob and thereby provide displacement data;
arranging said at least two sensors in a sensing vicinity of at least one of said at least one plumb bob such that at least two of said sensing directions are not parallel to each other;
providing a control unit configured to receive said displacement data from at least two of said at least two sensors; and
automatically reporting to an external unit, with said control unit, a parameter representing a displacement of the wind turbine tower.

13. A method according to claim 12, wherein said automatically reporting comprising reporting an alert when a predetermined alert criteria is met, said alert criteria optionally relating to a specific magnitude of displacement of the wind turbine tower.

* * * * *